US011967280B2

(12) United States Patent
Lim et al.

(10) Patent No.: US 11,967,280 B2
(45) Date of Patent: Apr. 23, 2024

(54) DISPLAY DEVICE

(71) Applicant: LG Display Co., Ltd., Seoul (KR)

(72) Inventors: Hyunkyo Lim, Paju-si (KR); Dongsup Sim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/068,927

(22) Filed: Dec. 20, 2022

(65) Prior Publication Data

US 2023/0215364 A1 Jul. 6, 2023

(30) Foreign Application Priority Data

Dec. 31, 2021 (KR) ........................ 10-2021-0194165

(51) Int. Cl.
*G09G 3/3233* (2016.01)
*G09G 3/3266* (2016.01)
*G09G 3/3275* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/0247* (2013.01); *G09G 2320/0626* (2013.01)

(58) Field of Classification Search
None
See application file for complete search history.

(56) References Cited

U.S. PATENT DOCUMENTS

| | | | | |
|---|---|---|---|---|
| 11,271,181 B1 * | 3/2022 | Yang | ................. | H01L 27/14609 |
| 11,557,244 B2 * | 1/2023 | Han | ......................... | G09G 3/32 |
| 2017/0162113 A1 * | 6/2017 | Lin | ...................... | G09G 3/3233 |
| 2020/0226978 A1 * | 7/2020 | Lin | ...................... | H01L 29/7869 |
| 2021/0043132 A1 * | 2/2021 | Nam | .................... | G09G 3/3233 |
| 2021/0383754 A1 * | 12/2021 | Kawachi | .............. | G09G 3/3233 |
| 2023/0094230 A1 * | 3/2023 | Noh | .................... | G09G 3/3233 345/690 |

FOREIGN PATENT DOCUMENTS

KR 10-2021-0063163 A 6/2021

* cited by examiner

*Primary Examiner* — Sepehr Azari
(74) *Attorney, Agent, or Firm* — Seed IP Law Group LLP

(57) ABSTRACT

A display device includes a display panel including a plurality of pixels connected to a data line and a gate line; a data driver configured to apply a data voltage to the data line for an active period and to apply a parking voltage to the data line for a blank period for which the data voltage is not applied; a gate driver for applying a scan signal to the gate line; a light-emission signal generator for applying a light-emission signal to the plurality of pixels; and a controller configured to operate the display device based on a plurality of bands, wherein the plurality of bands have different highest target luminance levels based on operating environments of the display device, wherein in at least one of the plurality of bands, a duty ratio of the light-emission signal is smaller than a duty ratio of the parking voltage. Thus, parking voltage mura is reduced and uniformity of the display panel is improved to improve image quality.

15 Claims, 10 Drawing Sheets

DISPLAY DEVICE

CROSS-REFERENCE TO RELATED APPLICATION

This application claims priority from Korean Patent Application No. 10-2021-0194165 filed on Dec. 31, 2021 in the Korean Intellectual Property Office, and all the benefits accruing therefrom under 35 U.S.C. 119, the contents of which in its entirety are herein incorporated by reference.

BACKGROUND

Technical Field

The present disclosure relates to a display device, and more particularly, to a display device in which uniformity degradation due to flicker, and mura such as a spot is reduced.

Description of the Related Art

An image display device which implements various information on a screen is a key factor in the information and communication era, and is thinner, lighter, and has higher performance. Accordingly, the display device that may be manufactured in a lightweight and thin manner is in the spotlight. An organic light-emitting display device may be a self light-emitting device and may be advantageous in terms of power consumption due to low voltage operation, and may have high-speed response speed, high light-emitting efficiency, wide field of view (FOV) and high contrast ratio, and thus is being studied as a next-generation display. The organic light emitting display device implements an image using a plurality of sub-pixels arranged in a matrix form. Each of the plurality of sub-pixels includes a light-emitting element and a pixel circuit including a plurality of transistors for independently driving the light-emitting elements.

Specific examples of a flat panel display device may include a liquid crystal display device (LCD), a quantum dot display device (QD), a field emission display device (FED), an organic light-emitting display device (OLED), etc. The organic light-emitting display device that does not require a separate light source may be compact and may achieve clear color display. The OLED device may include a self-luminous organic light-emitting diode (OLED) and thus may have fast response speed, high contrast ratio, high light-emission efficiency, high luminance, and wide field of view (FOV).

The organic light-emitting display device including the organic light-emitting diode may have various advantages because the organic light-emitting display device displays an image based on light generated from the light-emitting element within the pixel. However, in the OLED device, flicker and mura such as a spot may occur due to coupling between internal lines in the pixel during an operation and an operating condition of a drive signal, etc. Thus, uniformity defect may occur. This may act as a factor that deteriorates image quality of the display device.

Accordingly, various driving techniques are being developed to solve the image abnormality. In order to improve the image quality, an operating condition of the pixel may be controlled to improve operation performance.

BRIEF SUMMARY

The present disclosure proposes a scheme to solve the above-mentioned problem. Thus, a technical benefit of the present disclosure is to provide a display device which may control an operation voltage condition of a pixel circuit to reduce flicker and uniformity degradation.

Purposes of the present disclosure are not limited to the above-mentioned purpose. Other technical benefits and advantages of the present disclosure that are not mentioned may be understood based on following descriptions, and may be more clearly understood based on embodiments of the present disclosure. Further, it will be easily understood that the purposes and advantages of the present disclosure may be realized using means shown in the claims and combinations thereof.

In accordance with one aspect of the present disclosure to achieve the technical benefit, a display device includes: a display panel including a plurality of pixels, each of the plurality of pixels being connected to a respective data line and a respective gate line; a data driver configured to apply a data voltage to the data line for an active period and to apply a parking voltage to the data line for a blank period for which the data voltage is not applied thereto; a gate driver for applying a scan signal to the gate line; a light-emission signal generator for applying a light-emission signal to the plurality of pixels; and a controller configured to operate the display device based on a plurality of bands, wherein the plurality of bands have different highest target luminance levels based on operating environments of the display device, wherein in at least one of the plurality of bands, a duty ratio of the light-emission signal is smaller than a duty ratio of the parking voltage.

According to an embodiment of the present disclosure, the duty ratio of the light-emission signal may be controlled to reduce parking voltage mura and to improve uniformity of a display panel, such that image quality may be improved.

Effects of the present disclosure are not limited to the above-mentioned effects, and other effects as not mentioned will be clearly understood by those skilled in the art from following descriptions.

DETAILED DESCRIPTIONS

Figure 1:
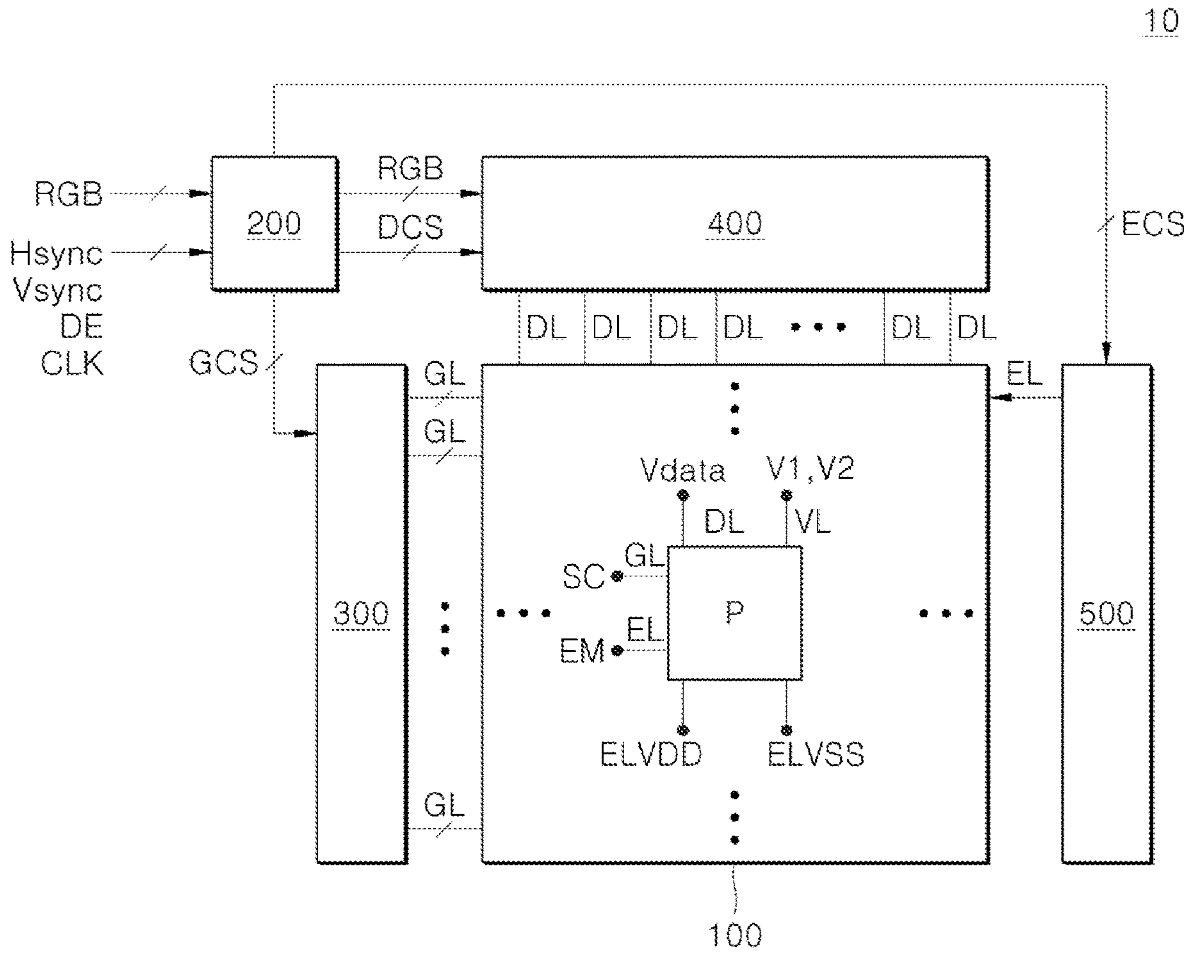
FIG. 1 is a block diagram of a display device according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed below, but may be implemented in various different forms. Thus, these embodiments are set forth only to make the present disclosure complete, and to completely inform the scope of the disclosure to those of ordinary skill in the technical field to which the present disclosure belongs.

A shape, a size, a ratio, an angle, a number, etc., disclosed in the drawings for describing the embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise," "including," "include," and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to," or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

In descriptions of temporal relationships, for example, temporal precedent relationships between two events such as "after," "subsequent to," "before," etc., another event may occur therebetween unless "directly after," "directly subsequent" or "directly before" is indicated.

It will be understood that, although the terms "first," "second," "third," and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

As used herein, the term "substantially," "about," and similar terms are used as terms of approximation, and are intended to account for inherent deviations in measured or calculated values that would be recognized by those of ordinary skill in the art. The term may be used to prevent unauthorized exploitation by an unauthorized infringer to design around accurate or absolute figures provided to help understand the present disclosure.

Unless otherwise defined, all terms including technical and scientific terms used herein have the same meaning as commonly understood by one of ordinary skill in the art to which the embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In description of a signal flow relationship, for example, even when 'a signal is transmitted from a node A to a node B,' a signal may be transmitted from the node A to the node B via another node unless 'immediately' or 'directly' is used.

Hereinafter, an example of a display device according to an embodiment of the present disclosure will be described in detail with reference to the accompanying drawings. In allocating reference numerals to components of the drawings, the same components may have the same reference numerals across different drawings. Moreover, for convenience of illustration, a scale of each of components shown in the accompanying drawings may be different from an actual scale. Thus, the present disclosure is not limited to the scales shown in the drawings.

Hereinafter, various embodiments of the present disclosure will be described in detail with reference to the accompanying drawings.

FIG. 1 is a block diagram schematically showing a display device according to an embodiment of the present disclosure.

Referring to FIG. 1, a display device 10 includes a display panel 100 including a plurality of pixels, a gate driver 300 for supplying a gate signal to each of the plurality of pixels, a data driver 400 for supplying a data signal to each of the plurality of pixels, a light-emission signal generator 500 for supplying a light-emission signal to each of the pixels, and a controller 200.

The controller 200 processes image data RGB input from an external device based on a size and resolution of the display panel 100 and supplies the processed image data to the data driver 400. The controller 200 may generate a gate control signal GCS, a data control signal DCS, and a light-emission control signal ECS, based on externally input synchronization signals SYNC, for example, a dot clock signal CLK, a data enable signal DE, a horizontal synchronization signal Hsync, and a vertical synchronization signal Vsync. The controller 200 may supply the gate control signal GCS, the data control signal DCS, and the light-emission control signal ECS to the gate driver 300, the data driver 400, and the light-emission signal generator 500, respectively to control the gate driver 300, the data driver 400 and the light-emission signal generator 500.

The controller 200 may be embodied as a combination of various processors, for example, a combination of a microprocessor, a mobile processor, and an application processor.

The controller 200 generates a signal so that the pixel may operate at various refresh rates. That is, the controller 200 generates signals related to an operation so that the pixel operates in a variable refresh rate (VRR) mode or a refresh rate of the pixel is switchable to between a first refresh rate and a second refresh rate. For example, the controller 200 may simply change a speed of a clock signal, generate a synchronization signal to generate a horizontal blank or a vertical blank, or operate the gate driver 300 in a mask scheme such that the pixels may operate at various refresh rates.

Further, the controller 200 generates various signals for operating the pixel at the first refresh rate. In particular, when the pixel operates at the first refresh rate, the controller 200 may generate the light-emission control signal ECS such that the light-emission signal generator 500 generates a light-emission signal EM(n) with a first duty ratio. Thereafter, the controller 200 may operate the pixel at the second refresh rate. For this purpose, the controller 200 generates various signals for operating the pixel at the second refresh rate. In particular, when the pixel operates at the second refresh rate, the controller may generate the light-emission control signal ECS such that the light-emission signal generator 500 generates a light-emission signal EM(n) having a second duty ratio different from the first duty ratio.

The gate driver 300 supplies a scan signal SC to the gate line GL based on the gate control signal GCS supplied from the controller 200. In FIG. 1, the gate driver 300 is shown to be disposed on one side of the display panel 100 and be spaced apart from the display panel 100. However, the number and the position of the gate driver 300 are not limited thereto. That is, the gate driver 300 may be disposed on one side or each of both opposing sides of the display panel 100 in a GIP (Gate In Panel) scheme.

The data driver 400 converts the image data RGB into data voltage Vdata based on the data control signal DCS supplied from the controller 200, and supplies the converted data voltage Vdata to the pixel via the data line DL.

In the display panel 100, a plurality of gate lines GL and a plurality of light-emission lines EL overlap a plurality of data lines DL. Each of a plurality of pixels is connected to the gate line GL, the light-emission line EL and the data line DL. Specifically, one pixel receives a scan signal from the gate driver 300 through the gate line GL, and receives a data signal from the data driver 400 through the data line DL, receives the light-emission signal EM(n) through the light-emission line EL, and receives various powers through a power supply line. In this regard, the gate line GL supplies the scan signal SC, the light-emission line EL supplies the light-emission signal EM(n), and the data line DL supplies the data voltage Vdata. However, according to various embodiments, the gate line GL may include a plurality of scan signal lines, and the data line DL may further include a plurality of power supply lines VL. Further, the light-emission line EL may include a plurality of light-emission signal lines. Further, the pixel receives high-potential voltage ELVDD and low-potential voltage ELVSS. Further, one pixel may receive first and second bias voltages V1 and V2 via two power supply lines VL.

Further, each pixel includes a light-emitting element ELD and a pixel circuit that controls an operation of the light-emitting element ELD. In this regard, the light-emitting element ELD is composed of an anode, a cathode, and an organic light-emitting layer between the anode and cathode. The pixel circuit includes a plurality of switching elements, a drive element and a capacitor. In this regard, each of the switching element and the drive element may be embodied as a TFT. In the pixel circuit, the drive TFT controls an amount of current supplied to the light-emitting element ELD based on a difference between the data voltage charged in the capacitor and a reference voltage to adjust an amount of light-emission from the light-emitting element ELD. Further, the plurality of switching TFTs receive the scan signal SC supplied through the gate line GL and the light-emission signal EM(n) supplied through the light-emission line EL and charge the data voltage Vdata to the capacitor based on the received signals.

The display device 10 according to an embodiment of the present disclosure includes the gate driver 300, the data driver 400, and the light-emission signal generator 500 for operating the display panel 100 including the plurality of pixels, and the controller 200 for controlling the gate driver 300, the data driver 400, and the light-emission signal generator 500. In this regard, the light-emission signal generator 500 is configured to be able to adjust a duty ratio of the light-emission signal EM(n). For example, the light-emission signal generator 500 may include a shift register and a latch to adjust the duty ratio of the light-emission signal EM(n). When the pixel operates at the first refresh rate, the light-emission signal generator 500 generates the light-emission signal EM(n) having the first duty ratio based on the light-emission control signal ECS generated from the controller 200 and supplies the generated light-emission signal to the pixel circuit. When the pixel operates at the second refresh rate, the light-emission signal generator 500 generates the light-emission signal EM(n) having the second duty ratio based on the light-emission control signal ECS generated from the controller 200 and supplies the generated light-emission signal to the pixel circuit, wherein the second duty ratio is different from the first duty ratio.

Figure 2A:
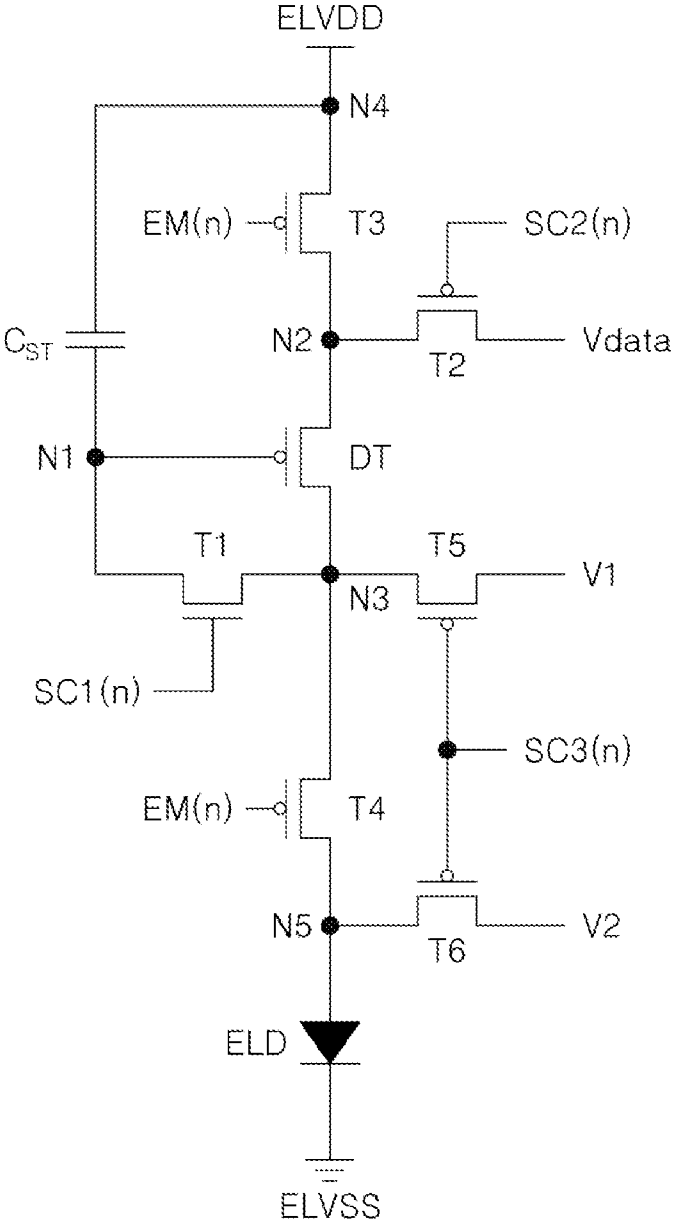
FIG. 2A, FIG. 2B and FIG. 2C are circuit diagrams showing a pixel circuit of a display device according to an embodiment of the present disclosure.
Figure 2B:
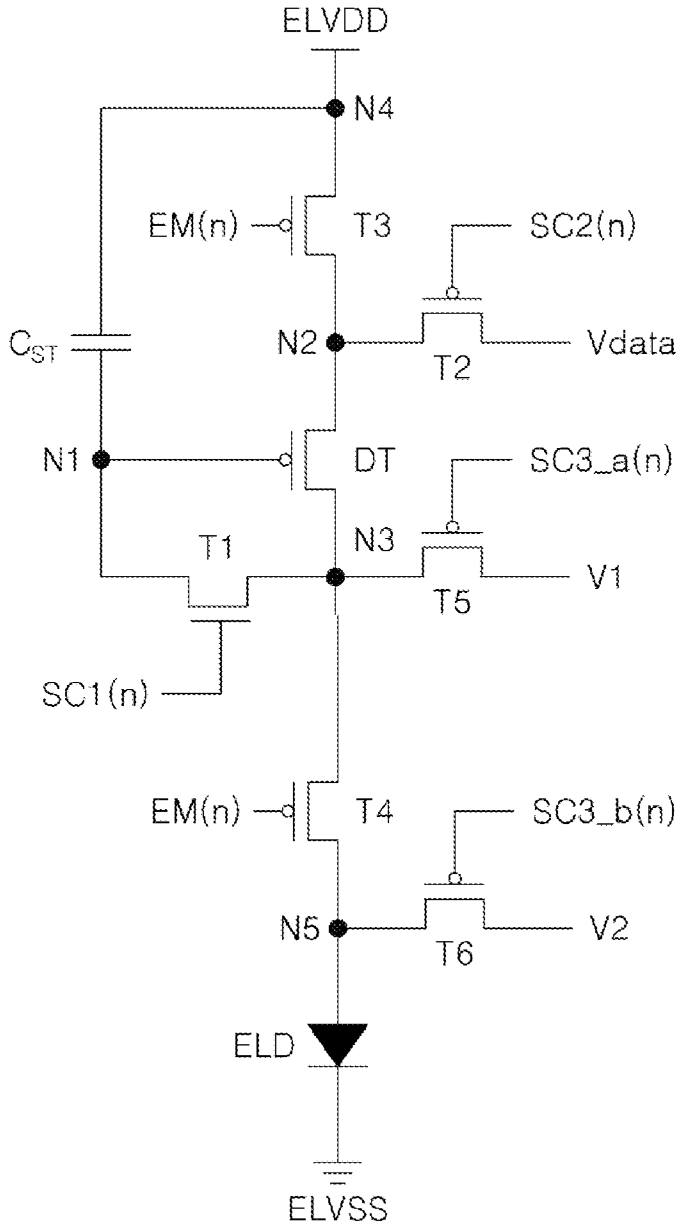
Figure 2C:
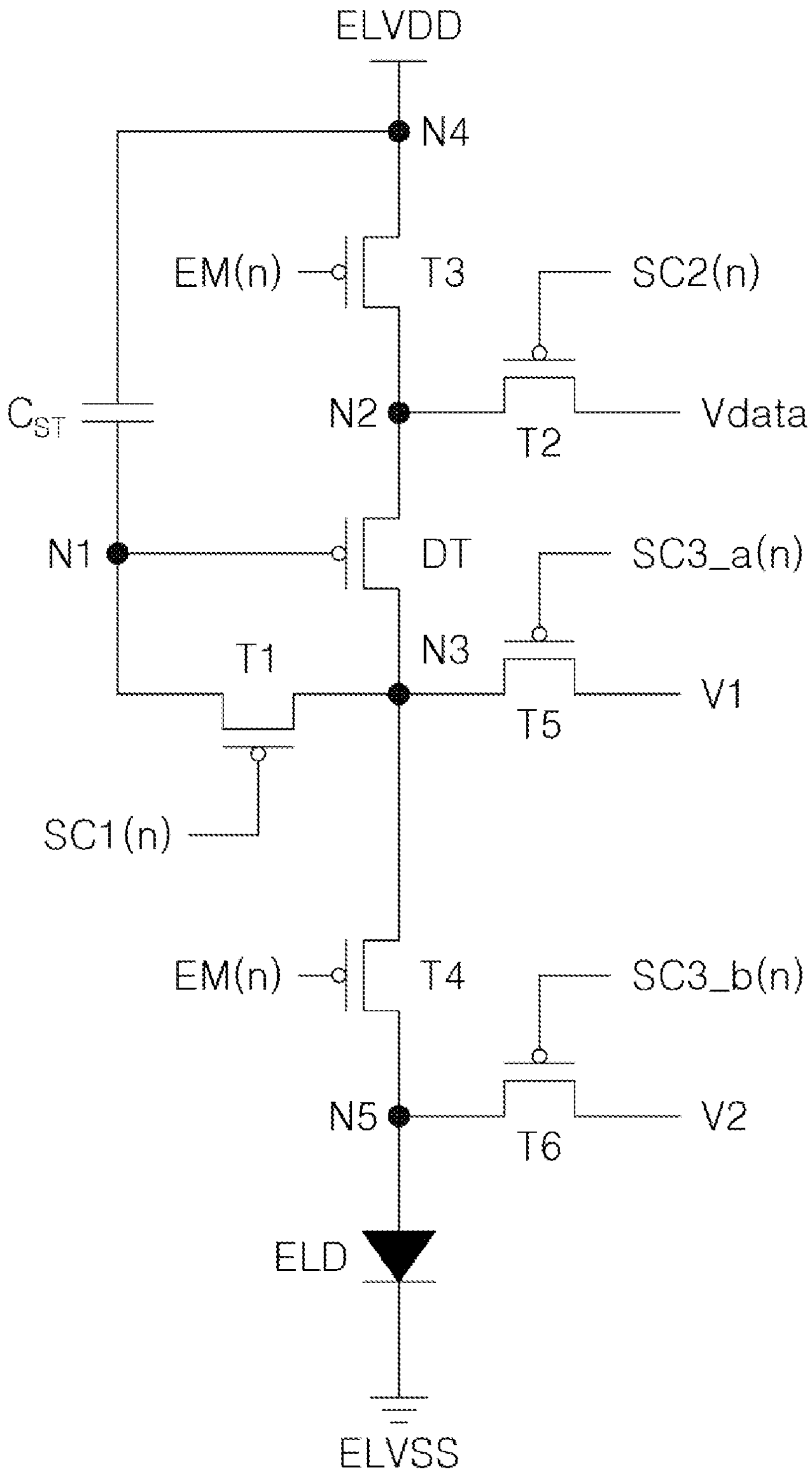

FIGS. 2A, 2B and 2C are illustrative circuit diagrams of a pixel circuit in a display device according to an embodiment of the present disclosure.

FIGS. 2A-2C shows examples of the pixel circuit for illustration. A structure of the pixel circuit is not limited particularly as long as the pixel circuit receives the light-emission signal EM(n) and controls light-emission of the light-emitting element ELD based on the light-emission signal. For example, the pixel circuit may include an additional scan signal, a switching TFT to which the additional scan signal is applied, and a switching TFT to which an additional initialization voltage is applied. A connection relationship between switching elements or a connection position of the capacitor may be variously modified. That is, as long as the light-emission of the light-emitting element ELD is controlled based on change in the duty ratio of the light-emission signal EM(n), and thus the light-emission may be controlled based on the refresh rate, pixel circuits of various structures may be used. For example, various pixel circuits such as 3T1C, 4T1C, 6T1C, 7T1C, and 7T2C may be used. Hereinafter, for convenience of description, an example in which the display device has the pixel circuit of 7T1C in FIG. 2A-2C is described.

Referring to FIG. 2A, each of the plurality of pixels P may include a pixel circuit having a driving transistor DT, and a light-emitting element ELD connected to the pixel circuit.

The pixel circuit may control drive current flowing through the light-emitting element ELD to operate the light-emitting element ELD. The pixel circuit may include the driving transistor DT, first, second, third, fourth, fifth and sixth transistors T1, T2, T3, T4, T5 and T6 and a storage capacitor Cst. Each of the transistors DT, T1 to T6 may include a first electrode, a second electrode, and a gate electrode. One of the first electrode and the second electrode may act as a source electrode, while the other of the first electrode and the second electrode may act as a drain electrode.

Each of the transistors DT, T1 to T6 may be embodied as a PMOS transistor or an NMOS transistor. In embodiments of FIG. 2A and FIG. 2B, the first transistor T1 is embodied as an NMOS transistor, and each of the remaining transistors DT, T2 to T6 is embodied as a PMOS transistor. Moreover, in an embodiment of FIG. 2C, each of the transistors DT, T1 to T6 is embodied as a PMOS transistor.

Hereinafter, an example in which the first transistor T1 is embodied as an NMOS transistor, and each of the remaining transistors DT, T2 to T6 is embodied as a PMOS transistor will be described. Accordingly, the first transistor T1 receives a high level voltage so as to be turned on, and each of the other transistors DT, T2 to T6 receives a low level voltage so as to be turned on.

According to an example, the first transistor T1 of the pixel circuit may act as a compensation transistor, the second transistor T2 of the pixel circuit may act as a data supply transistor, each of the third and fourth transistors T3 and T4 of the pixel circuit may act as a light-emission control transistor, and each of fifth and sixth transistors T5 and T6 of the pixel circuit may act as a bias transistor.

The light-emitting element ELD may include a pixel electrode (or an anode electrode) and a cathode electrode. The pixel electrode of the light-emitting element ELD may be connected to a fifth node N5, and the cathode electrode thereof may be connected to the second power voltage ELVSS.

The driving transistor DT may include a first electrode connected to a second node N2, a second electrode connected to a third node N3, and a gate electrode connected to a first node Ni. The driving transistor DT may provide the drive current Id to the light-emitting element ELD based on a voltage of the first node N1 (or the data voltage stored in the capacitor Cst to be described later).

The first transistor T1 may include a first electrode connected to the first node N1, a second electrode connected to the third node N3, and a gate electrode receiving a first scan signal SC1(*n*). The first transistor T1 may be turned on in response to the first scan signal SC1(*n*), and thus may connect the third node N3 to the first node N1. The first transistor T1 may be diode-connected to and disposed between the first node N1 and the third node N3 and may sample threshold voltage Vth of the driving transistor DT. The first transistor T1 may act as a compensation transistor.

The capacitor Cst may be connected to and disposed between the first node N1 and the fourth node N4. The capacitor Cst may store therein or maintain the data signal Vdata provided thereto.

The second transistor T2 may include a first electrode connected to the data line DL (or receiving the data signal Vdata), a second electrode connected to the second node N2, and a gate electrode receiving a second scan signal SC2(*n*). The second transistor T2 may be turned on in response to the second scan signal SC2(*n*), and thus may transmit the data signal Vdata to the second node N2. The second transistor T2 may function as a data supply transistor.

The third transistor T3 and the fourth transistor T4 (or first and second light-emission control transistors) may be connected to and disposed between the first power voltage ELVDD and the light-emitting element ELD, and thus may constitute a current movement path along which the drive current generated from the driving transistor DT moves.

The third transistor T3 may include a first electrode connected to the fourth node N4 so as to receive the first power voltage ELVDD, a second electrode connected to the second node N2, and a gate electrode to receive the light-emission signal EM(n).

Similarly, the fourth transistor T4 may include a first electrode connected to the third node N3, a second electrode connected to the fifth node N5 (or the pixel electrode of the light-emitting element ELD), and a gate electrode receiving the light-emission signal EM(n).

The third and fourth transistors T3 and T4 may be turned on in response to the light-emission signal EM(n). In this case, the drive current may be provided to the light-emitting element ELD, and thus the light-emitting element ELD may emit light at luminance corresponding to the drive current.

The fifth transistor T5 may include a first electrode connected to the third node N3, a second electrode receiving first bias voltage V1, and a gate electrode receiving a third scan signal SC3(*n*).

The sixth transistor T6 may include a first electrode connected to the fifth node N5, a second electrode receiving second bias voltage V2, and a gate electrode receiving the third scan signal SC3(*n*). In FIG. 2A, the gate electrodes of the fifth and sixth transistors T5 and T6 are configured to receive the third scan signal SC3(*n*) in a common manner. However, the present disclosure is not necessarily limited thereto. As shown in FIG. 2B and FIG. 2C, the gate electrodes of the fifth and sixth transistors T5 and T6 may be configured to respectively receive separate scan signals so to be independently controlled.

The sixth transistor T6 may be turned on in response to the third scan signal SC3(*n*) before the light-emitting element ELD performs light-emission (or after the light-emitting element ELD performs the light-emission). The sixth transistor T6 may initialize the pixel electrode (or the anode electrode) of the light-emitting element ELD, based on the second bias voltage V2. The light-emitting element ELD may have a parasitic capacitor formed between the pixel electrode and the cathode electrode. Moreover, the parasitic capacitor may be charged during light-emission of the light-emitting element ELD, so that the pixel electrode of the light-emitting element ELD may have a specific voltage. Therefore, the second bias voltage V2 may be applied to the pixel electrode of the light-emitting element ELD via the sixth transistor T6, thereby initializing an amount of charges accumulated in the light-emitting element ELD.

Figure 3A:
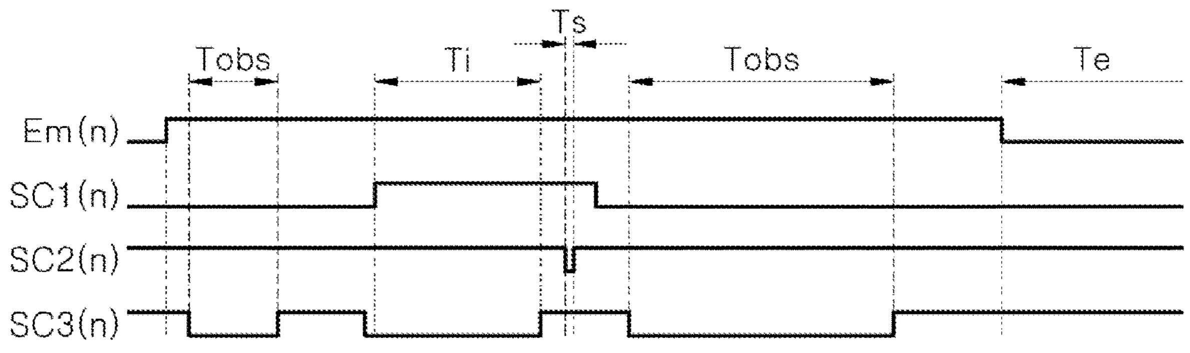
FIG. 3A and FIG. 3B are diagrams for illustrating an operation of the pixel circuit and a light-emitting element of the display device shown in FIG. 2A.
Figure 3B:
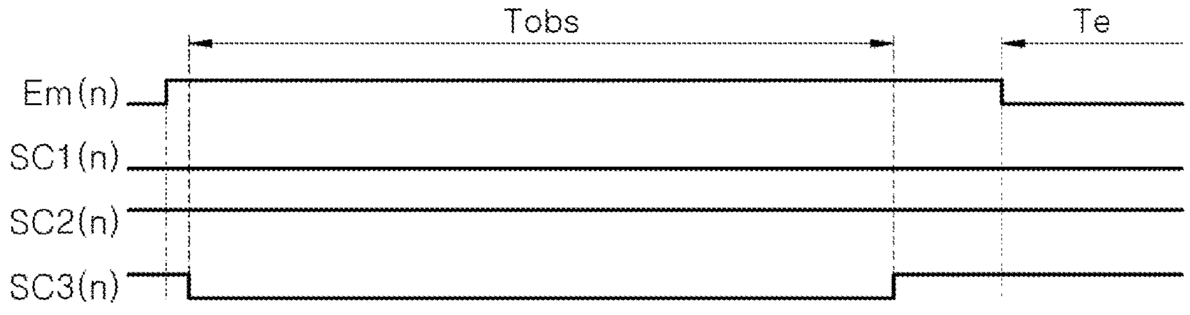

FIGS. 3A and 3B are diagrams for illustrating the operation of the pixel circuit and the light-emitting element of the display device shown in FIG. 2A.

Referring to FIG. 3A and FIG. 3B, each of the plurality of pixels P may initialize the voltage charged or remaining in the pixel circuit. Specifically, effect of the data voltage Vdata stored in a previous frame may be removed. Accordingly, each of the plurality of pixels P may display an image corresponding to new data voltage Vdata.

An operation of the pixel circuit may include at least one initialization period, a sampling period, and a light-emitting period. However, this is only one embodiment. The present disclosure is not necessarily limited to this order.

A display device according to an embodiment of the present disclosure may operate separately in each of a refresh frame and a reset frame. In the refresh frame, the data voltage Vdata may be programmed in each pixel P, and thus the light-emitting element ELD may emit light. Moreover, the reset frame may be a vertical blank frame. The anode of the light-emitting element ELD may be reset during the reset frame. As used herein, the term "frame," "refresh frame," and "reset frame" may refer to a concept of a temporal period. In some cases, the term "frame," "refresh frame," and "reset frame" may refer to an image or an operation mode.

In the display device according to an embodiment of the present disclosure, the refresh frame may be divided into an on bias stress period Tobs (hereinafter, referred to as "stress period"), an initial period Ti, a sampling period Ts, and an emission period Te. The stress period Tobs refers to a period for which bias stress is applied to the third node N3 as the drain electrode of the driving transistor DT. The initial period Ti refers to a period to initialize the voltage of the third node N3 as the drain electrode of the driving transistor DT. The sampling period Ts refers to a period for sampling the threshold voltage Vth of the driving transistor DT and programming the data voltage Vdata. The emission period Te refers to a period for light-emission of the light-emitting element ELD based on the drive current resulting from the programmed source-gate voltage of driving transistor DT.

Specifically, referring to FIG. 3A, during a first stress period Tobs, the third scan signal SC3(*n*) has a low level as a turn-on level. Accordingly, the fifth transistor T5 may be turned on to apply the first bias voltage V1 from the power supply lines VL to the third node N3. The first bias voltage V1 may refer to stress voltage Vobs or initialization voltage Vini. The stress voltage Vobs may be selected from within a voltage range sufficiently higher than an operating voltage of the light-emitting element ELD, and may be set to a voltage equal to or lower than the first driving power ELVDD. That is, the bias stress may be applied to the third node N3 as the drain electrode of the driving transistor DT during the stress period Tobs such that gate-source voltage Vgs of the driving transistor DT may be lowered. Therefore, during the stress period Tobs, source drain current of the driving transistor DT may flow such that hysteresis of the driving transistor DT may be reduced.

Moreover, the sixth transistor T6 may be turned on to apply the second bias voltage V2 to the fifth node N5. That is, the anode electrode of the light-emitting element ELD is reset to the second bias voltage V2. The second bias voltage V2 may refer to reset voltage VAR.

Moreover, referring to FIG. 3A, during the initial period Ti, the first scan signal SC1(*n*) has a high level as a turn-on level, and the third scan signal SC3(*n*) has a low level as a turn-on level. Accordingly, the first transistor T1 and the fifth transistor T5 may be turned on to apply the initialization voltage Vini from the power supply lines VL to the second node N2. As a result, the gate electrode of the driving transistor DT may be initialized based on the initialization voltage Vini. The initialization voltage Vini may be selected from within a voltage range sufficiently lower than the operating voltage of the light-emitting element ELD, and may be set to a voltage equal to or lower than the second driving power ELVSS. Moreover, during the initial period Ti, the sixth transistor T6 may be turned on again, such that the reset voltage VAR is applied to the fifth node N5.

Moreover, referring to FIG. 3A, during the sampling period Ts, the first scan signal SC1(*n*) has a high level as a turn-on level, and the second scan signal SC2(*n*) has a low level as a turn-on level. Moreover, during the sampling period Ts, the second transistor T2 is turned on, such that the data voltage Vdata is applied to the second node N2. Moreover, the first transistor T1 is turned on such that the driving transistor DT is diode-connected, and thus the gate electrode and the drain electrode of the driving transistor DT are short-circuited with each other. Thus, the driving transistor DT operates like a diode.

In the sampling period Ts, current flows between a source and a drain of the driving transistor DT. Because the gate electrode and the drain electrode of the driving transistor DT are diode-connected to each other, the voltage of the first node Ni rises due to the current flowing from the source electrode to the drain electrode until the gate-source voltage Vgs of the driving transistor DT becomes the threshold voltage Vth of the driving transistor DT.

Moreover, referring to FIG. 3A, during a second stress period Tobs, the third scan signal SC3(*n*) has a low level as a turn-on level. Accordingly, the sixth transistor T6 is turned on, such that the reset voltage VAR is applied to the fifth node N5. That is, the anode electrode of the light-emitting element ELD is reset to the reset voltage VAR. Moreover, the fifth transistor T5 may be turned on to apply the stress voltage Vobs to the third node N3. That is, applying the bias stress to the third node N3 as the drain electrode of the driving transistor DT during the stress period Tobs may allow the hysteresis effect of the driving transistor DT to be reduced.

Moreover, referring to FIG. 3A, during the emission period Te, the light-emission signal EM(n) is at a low level as a turn-on level. Accordingly, the third transistor T3 is turned on, such that first driving power ELVDD is applied to the second node N2. Moreover, since the first node N1 is coupled to the first driving power ELVDD via the storage capacitor Cst, the first driving power ELVDD is also reflected in the first node Ni. Moreover, the fourth transistor T4 is turned on, thereby forming a current path between the third node N3 and the fifth node N5. As a result, the drive current flowing through the source and drain electrodes of the driving transistor DT is applied to the light-emitting element ELD. Moreover, referring to FIG. 3B, during the reset frame, the first scan signal SC1(*n*) is maintained at a low level as a turn-off level, and the second scan signal SC2(*n*) is maintained at a high level as a turn-off level. Therefore, the data voltage Vdata is not programmed in each pixel P during the reset frame.

However, the third scan signal SC3(*n*) may swing periodically. That is, when the third scan signal SC3(*n*) periodically swings, the reset frame may include a plurality of stress periods Tobs. However, the present disclosure is not limited thereto, and the reset frame may include one stress period Tobs as shown in FIG. 3B.

In other words, during the reset frame, the anode electrode of the light-emitting element ELD may be reset to the reset voltage VAR, and the bias stress may be applied to the third node N3 as the drain electrode of the driving transistor DT.

Eventually, in the display device according to an embodiment of the present disclosure, the anode electrode of the light-emitting element ELD may be periodically reset over the refresh frame and the reset frame. Accordingly, continuous increase of the voltage of the anode electrode of the light-emitting element ELD due to leakage current may be prevented, such that the anode electrode of the light-emitting element ELD may maintain a constant voltage level. Accordingly, change in luminance of the display device may be minimized or reduced and thus the image quality may be improved.

Figure 4:
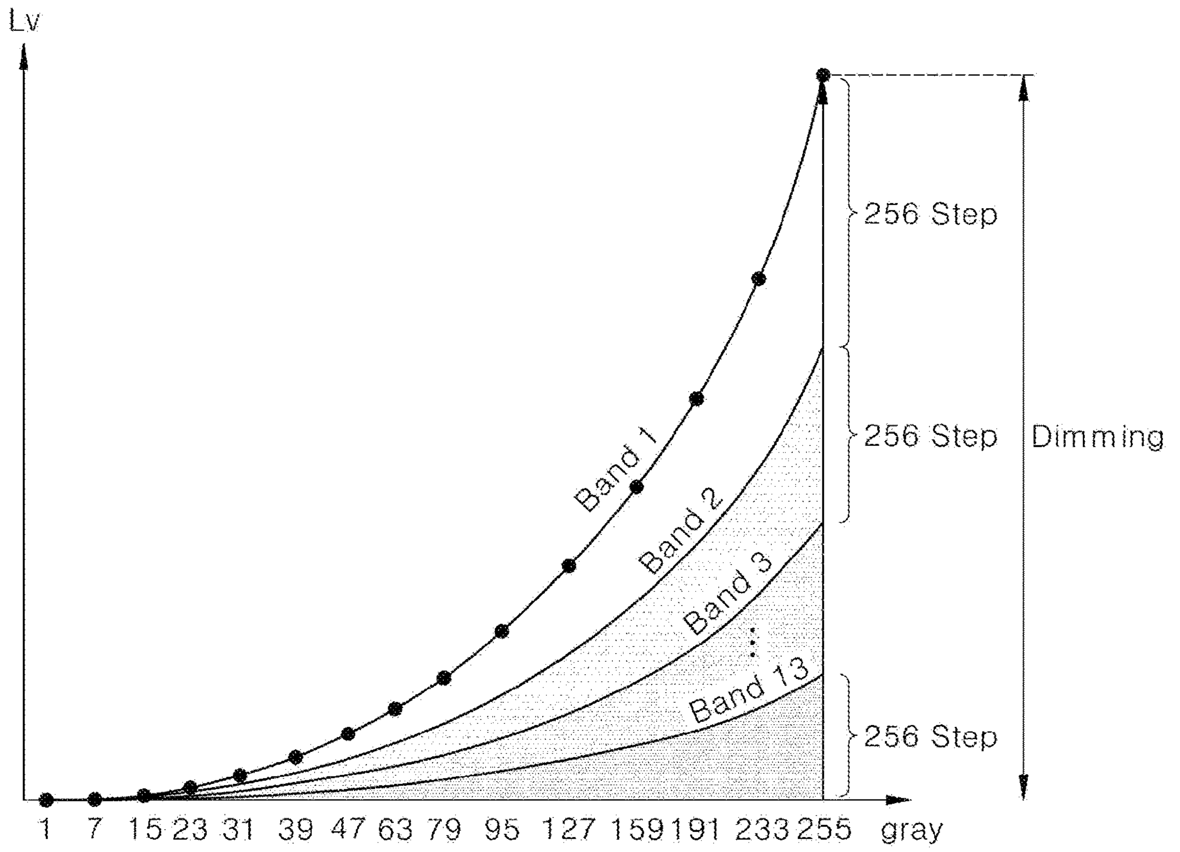
FIG. 4 is a diagram showing a band-based dimming level of a pixel circuit in the display device according to an embodiment of the present disclosure.

FIG. 4 is a diagram showing a band-based dimming level of a pixel circuit in a display device according to an embodiment of the present disclosure.

Referring to FIG. 4, the display panel 100 may include a plurality of bands Band1, Band2, Band3, . . . , Band13 such that target luminance Lv varies based on an operating environment. The dimming level may be adjusted based on the plurality of bands Band1, Band2, Band3, . . . , Band13. For example, the first band Band1 may correspond to a setting for a situation in which the display device selects the highest maximum target luminance Lv based on the ambient illuminance in daylight. The second band Band2 may correspond to a setting for a situation in which the display device is present under shade in daylight. The seventh band Band1 may correspond to a setting for a situation in which the display device is present in a cloudy day. The eighth band Band8 may correspond to a setting for a situation in which the display device is present under a night environment. The thirteenth band Band13 may correspond to a setting for a situation in which the display device is present under a darkroom environment. In addition, bands may be further subdivided and classified based on various use environments and applications.

In each of the plurality of bands Band1, Band2, Band3, . . . , Band13, the dimming level may vary to adjust a luminance step at a specific gray level. Further, the maximum target luminance Lv of each of the plurality of bands Band1, Band2, Band3, . . . , Band13 may be set such that the plurality of bands Band1, Band2, Band3, . . . , Band13 may have the same number of luminance steps. For example, 256 luminance steps may be present between the maximum target luminance Lv of the first band Band1 and the maximum target luminance Lv of the second band Band2.

The dimming level for adjusting the luminance may be variable in a range from 0 to 100%. Even at the same gray level, the dimming level may vary depending on the band, and thus the luminance may vary based on the band. For example, the maximum target luminance Lv of the first band Band1 may have a dimming level of 100%. Further, the dimming level may be adjusted based on the data voltage applied to the pixel and/or may be adjusted based on the duty ratio of the light-emission signal EM(n) applied thereto.

Figure 5A:
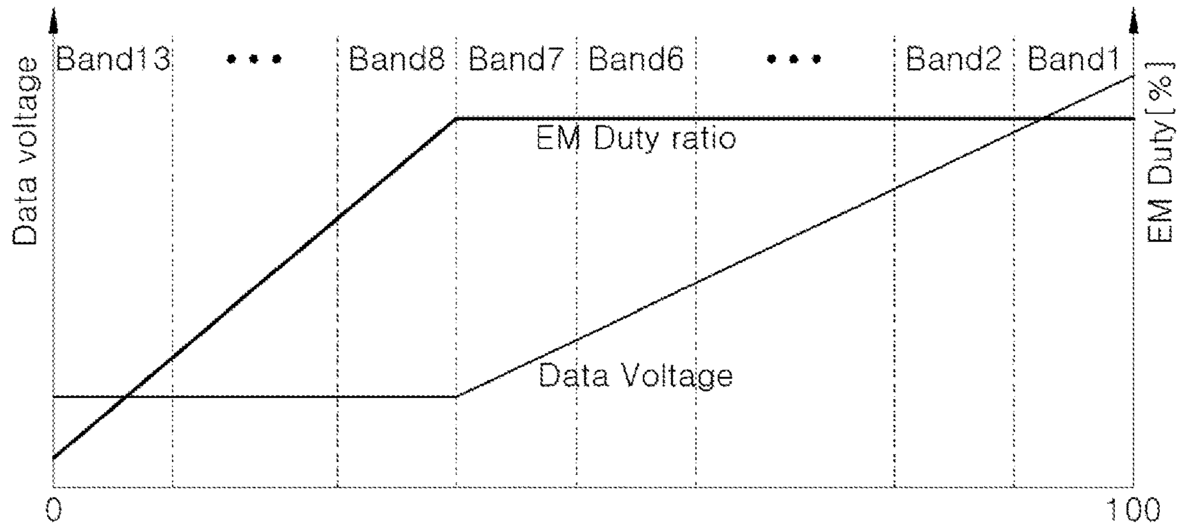
FIG. 5A is a diagram showing a band-based dimming level adjustment scheme of a pixel circuit in a display device according to an embodiment of the present disclosure.
Figure 5B:
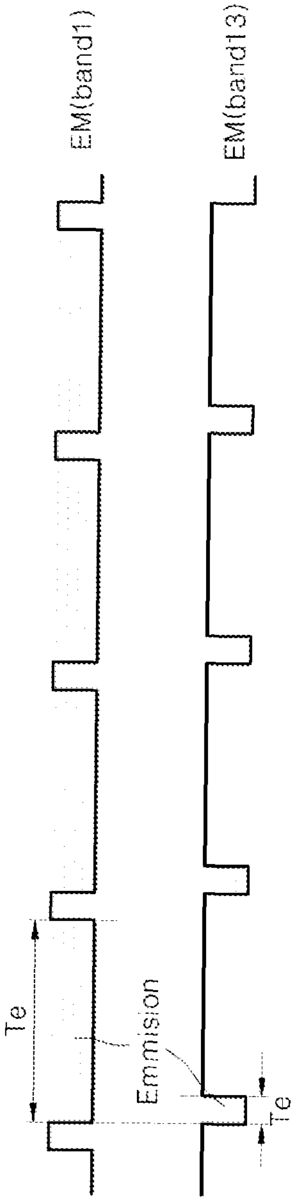
FIG. 5B is a diagram showing a light-emission signal having a duty ratio varying depending on a band.

FIG. 5A is a diagram showing a band-based dimming level adjustment scheme of a pixel circuit in a display device according to an embodiment of the present disclosure, and FIG. 5B is a diagram showing a light-emission signal having a duty ratio varying depending on the band.

Referring to FIG. 5A, in each of the plurality of bands Band1, Band2, Band3, . . . , Band13, the dimming level may be adjusted based on at least one of the data voltage Vdata applied to the pixel or the duty ratio of the light-emission signal EM(n) applied thereto.

The maximum target luminance Lv of one band among the plurality of bands Band1, Band2, Band3, . . . , Band13 may be equal to the minimum target luminance Lv of another band among the plurality of bands Band1, Band2, Band3, . . . , Band13. For example, the minimum target luminance Lv of the first band Band1 may be equal to the maximum target luminance Lv of the second band Band2.

Each of the first to seventh bands Band1, Band2, . . . , Band7 has a relatively higher target luminance Lv. Thus, an amount of change in the luminance based on the gray level may be large. In this regard, the luminance corresponds to the data voltage Vdata. The data voltage Vdata may be adjusted such that the dimming level may be adjusted.

Each of the eighth to thirteenth bands Band8, Band9, . . . , Band13 has a relatively lower target luminance Lv. Thus, the amount of change in the luminance based on the gray level may be small. Thus, when the dimming level is adjusted based on the data voltage Vdata, the pixel may not operate normally. Accordingly, in each of the eighth to the thirteenth bands Band8, Band9, . . . , Band13, the dimming level may be adjusted based on the duty ratio of the light-emission signal EM(n).

In other words, in each of the first to seventh bands Band1, Band2, . . . , Band7, the duty ratio of the light-emission signal EM(n) may be fixed, and the data voltage Vdata may vary such that the dimming level may be adjusted. Further, in each of the eighth to thirteenth bands Band8, Band9, . . . Band13, the data voltage Vdata may be fixed, and the duty ratio of the light-emission signal EM(n) may vary such that the dimming level may be adjusted.

Referring to FIG. 5B, the light-emission signal EM(n) may have the duty ratio varying based on the band. A voltage waveform of the second node N2 to which the third transistor T3 turned on/off based on the light-emission signal EM(n) is connected may vary based on the duty ratio of the light-emission signal EM(n). For example, in the first band Band1 where the duty ratio of the light-emission signal EM(n) is about 90%, the voltage waveform of the second node N2 has a continuously maintained form while the light-emission signal EM(n) is applied. Further, in the thirteenth band Band13 where the duty ratio of the light-emission signal EM(n) is about 9%, the voltage waveform of the second node N2 may change at the moment when the light-emission signal EM(n) is applied.

Figure 6:
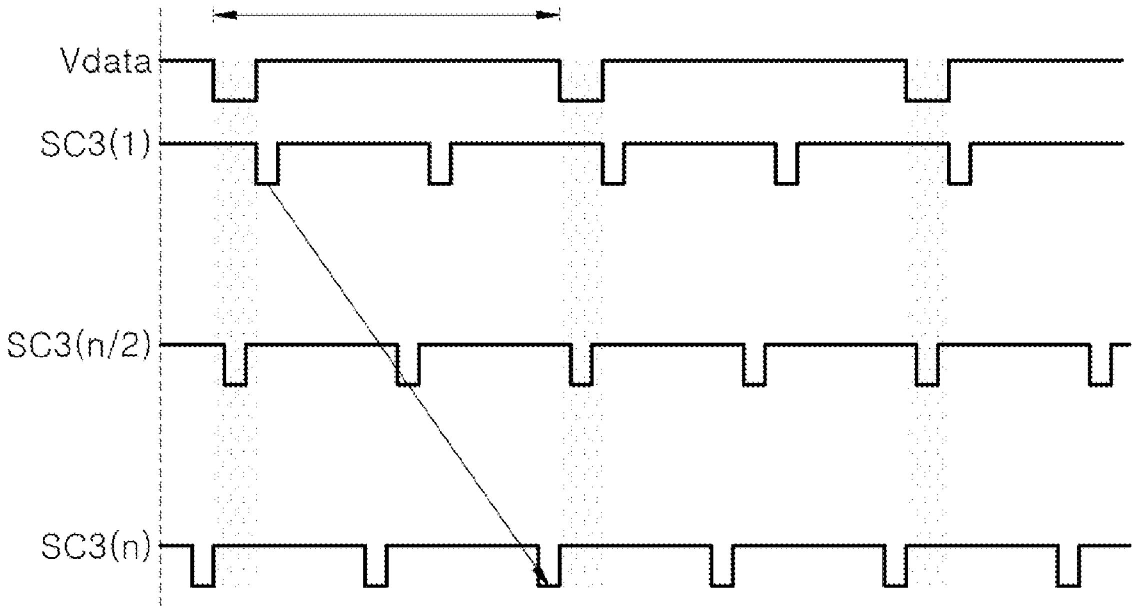
FIG. 6 is a diagram showing an operation of a scan signal during one frame in a display device according to an embodiment of the present disclosure.

FIG. 6 is a diagram showing an operation of a scan signal during one frame in a display device according to an embodiment of the present disclosure.

Referring to FIG. 6, each of the plurality of pixels P operates at a constant frequency. Then, when high-speed operation is selected, the pixel circuit operates at an increased refresh rate. The refresh rate refers to a rate at which the data voltage Vdata is refreshed. When low power consumption is selected, or low-speed operation is selected, the pixel circuit may operate in a decreased refresh rate. In this way, the pixel circuit may operate in a variable refresh rate (VRR) mode.

In this regard, the third scan signal SC3(*n*) supplied from the gate driver 300 to drive the sixth transistor T6 may have a frequency twice of an operation frequency supplied from the controller 200 to the display panel 100.

For example, when the refresh rate is 120 Hz, the operation frequency may be 120 Hz, and the third scan signal SC3(*n*) for turning on the TFT may have a frequency of 240 Hz. That is, since the third scan signal SC3(*n*) has a frequency twice as high as the operation frequency, the number of times that the sixth transistor T6 may be turned on increases, and thus the fifth node N5 may be initialized more frequently, Thus, performance of the driving transistor DT may be improved.

Referring to FIG. 6, a period for which the data voltage Vdata is applied may be an active period, while a period for which the data voltage is not applied may be a blank period.

When the data line DL is in a floating state during the blank period, the data line DL may affect the first and second nodes N1 and N2 adjacent thereto via coupling. This may cause flicker.

Therefore, in order to respond to the operation in the variable refresh rate (VRR) mode, the data voltage Vdata may be applied to the data line DL in the active period, and then, before applying data voltage Vdata of a next frame, parking voltage Vpark may be applied thereto during the blank period.

In this regard, when the parking voltage Vpark of a specific voltage level is applied thereto, flicker performance of all of the gray levels is adjusted using one parking voltage Vpark. Thus, mura such as a spot based on a relationship between levels of the data voltage Vdata and the parking voltage Vpark may occur at the specific gray level. The mura such as the spot is referred to as parking voltage mura Vpark Mura.

Further, when the parking voltage Vpark of the specific voltage level is applied during the blank period, the third scan signal SC3(*n*) sequentially applied to the gate line GL has a frequency twice of the operation frequency such that the sixth transistor T6 may be turned on in each of the plurality of pixels located in a middle area of the display panel 100. Thus, coupling occurs between the data line DL and the fifth node N5, thereby causing the parking voltage mura Vpark mura in the middle area of the display panel 100, thereby leading to decrease in uniformity.

The parking voltage mura Vpark Mura is based on the voltage level of the parking voltage Vpark in a more sensitive manner at low gray levels than in the high gray levels. Thus, the light-emitting element ELD may unnecessarily emit light in the low gray levels.

Figure 7:
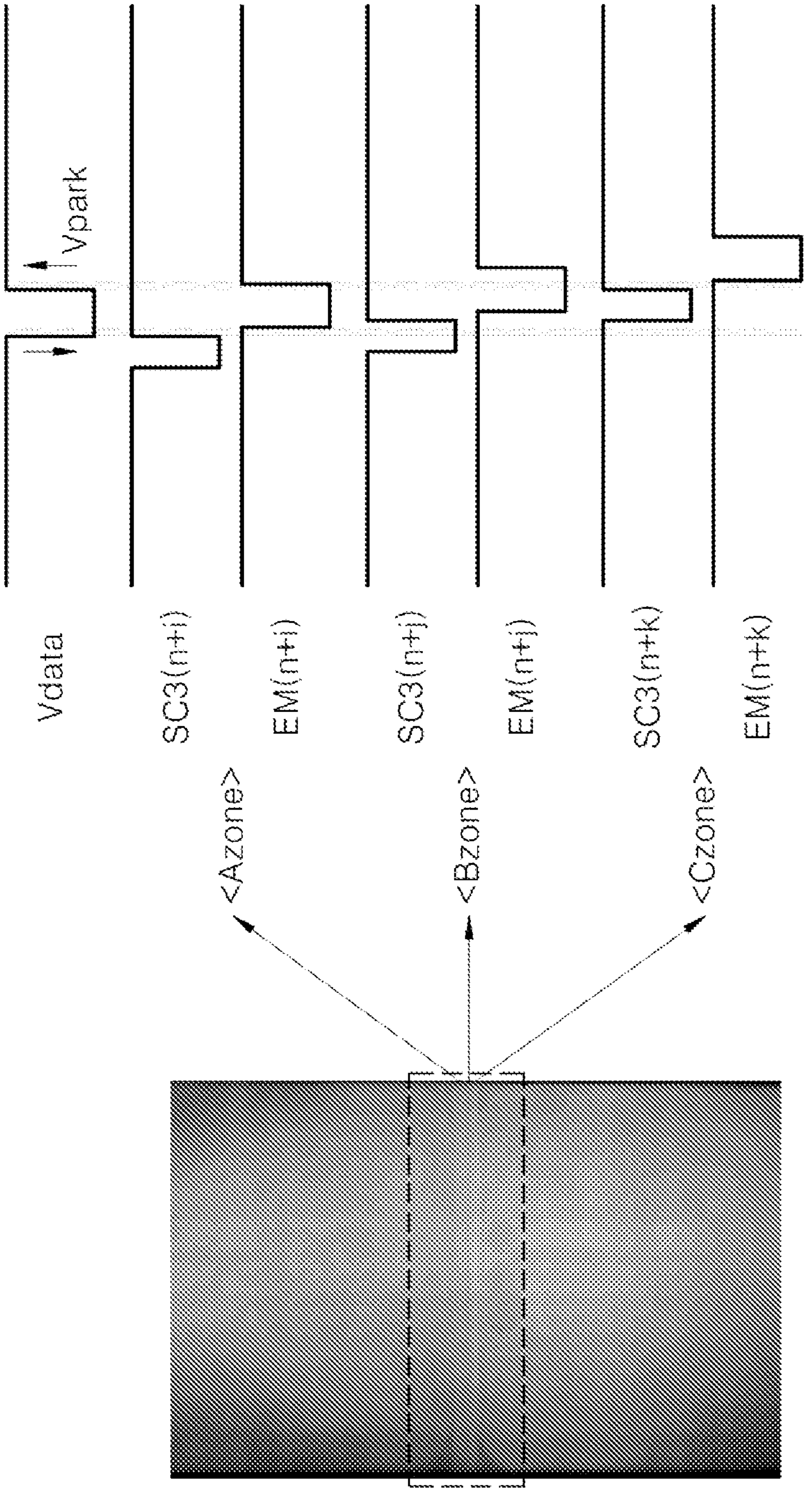
FIG. 7 is a diagram showing parking voltage mura generated in a middle area of a display panel in a display device according to an embodiment of the present disclosure.

FIG. 7 is a diagram showing the parking voltage mura generated in the middle area of the display panel in the display device according to an embodiment of the present disclosure.

Referring to FIG. 7, the parking voltage mura Vpark mura generated in the middle area of the display panel 100 may have 3 types based on a driving timing.

In an A zone, while the fifth transistor T5 is turned off by the third scan signal SC3(*n*+i), the voltage applied to the data line changes from the data voltage Vdata to the parking voltage Vpark, such that the voltage variation due to the change may be recognized.

In other words, when the fifth transistor T5 is turned off by the third scan signal SC3(*n*+i), the stress voltage Vobs is not applied to the third node N3 and thus the third node N3 is brought into a floating state, so that the second node N2 and the third node N3 have the same potential. At this time, when the voltage applied to the data line changes from the data voltage Vdata to the parking voltage Vpark, the coupling between and the second node N2 and the data line DL to which the data voltage Vdata or the parking voltage Vpark is applied may occur such that the voltage of the source electrode and the voltage of the drain electrode of the drive transistor DT may be temporarily different from each other. That is, an instantaneous potential difference occurs between the third node N3 and the second node N2 to which the driving transistor DT is connected. When the third transistor T3 may be turned on by the light-emission signal EM(n) before the second node N2 and the third node N3 are at the same potential again, this affects the drive current flowing through the light-emitting element ELD, thereby causing the luminance to rapidly decrease. Thus, a dark spot may be recognized.

Conversely, in a C zone, while the fifth transistor T5 is turned off by the third scan signal SC3(*n*+k), the voltage applied to the data line changes from the parking voltage Vpark to the data voltage Vdata, such that the voltage of the source electrode and the voltage of the drain electrode of the drive transistor DT may be temporarily different from each other. When the third transistor T3 is turned on by the light-emission signal EM(n+i), the luminance rapidly increases. Thus, a bright spot may be recognized.

In a B zone, the fifth transistor T5 is in a turned-on state by the third scan signal SC3(*n*+j) at the moment at which the voltage applied to the data line changes from the data voltage Vdata to the parking voltage Vpark. Thus, as the stress voltage Vobs is applied to the third node N3, a potential of the third node N3 does not change, and thus is not affected due to the change of the voltage applied to the data line from the data voltage Vdata to the parking voltage Vpark. Further, for a period for which the third transistor is already in the turned-on state by the light-emission signal EM(n+k), even when the voltage applied to the data line is changed from the parking voltage Vpark to the data voltage Vdata, this does not affect the potential of the third node N3.

In this way, the influence of the change timings of the active period and the blank period in the A zone, the B zone and the C zone located in the middle area of the display panel 100, depending on the driving timings of the third scan signal SC3(*n*) and the light-emission signal EM(n) may be recognized on a screen.

Figure 8:
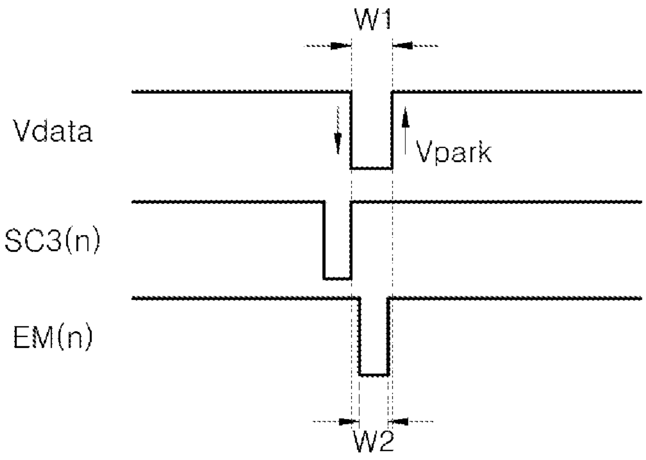
FIG. 8 is a diagram showing a duty ratio of each of data voltage and a light-emission signal in a display device according to an embodiment of the present disclosure.

FIG. 8 is a diagram showing a duty ratio of each of a data voltage and a light-emission signal in a display device according to an embodiment of the present disclosure.

Referring to FIG. 8, the parking voltage Vpark applied during the blank period may have a first duty ratio W1, and the light-emission signal EM(n) may have a second duty ratio W2. In this regard, in at least one band among the plurality of bands Band1, Band2, Band3, . . . , Band13, the second duty ratio W2 of a low level as a turn-on level of the light-emission signal EM(n) may be smaller than the first duty ratio W1 of the parking voltage Vpark.

In other words, the parking voltage mura Vpark mura is more sensitively recognized at the low gray level period of the low luminance. Thus, in at least one band among the eighth to thirteenth band Band8, Band9, . . . Band13 having a relatively lower target luminance Lv, the second duty ratio W2 of the light-emission signal EM(n) may be smaller than the first duty ratio W1 of the parking voltage Vpark.

For example, when the parking voltage Vpark applied for the blank period has the first duty ratio W1 of 40 horizontal periods, the second duty ratio W2 of the turn-on level of the light-emission signal EM(n) may be set to a value smaller than or equal to 36 horizontal periods which is 90% of the first duty ratio W1.

In this case, in the thirteenth band Band13 in which the light-emission signal EM(n) may have the smallest duty ratio, the duty ratio of the light-emission signal EM(n) may be about 8%.

Further, the middle area of the display panel 100 is affected by a timing at which the voltage applied to the data line changes between the data voltage Vdata and the parking voltage Vpark. Thus, when at least 3 horizontal periods have elapsed after the third scan signal SC3(*n*) is changed to a high level as a turn-off level, the light-emission signal EM(n) may be changed to a turn-on level. In other words, a time when the light-emission signal EM(n) is changed to the turn-on level may not overlap the time when the voltage applied to the data line changes. That is, the light-emitting element ELD emits light only after the temporary difference between the voltages of the source electrode and the drain electrode of the driving transistor DT due to the coupling is removed. Thus, when even when the third scan signal SC3(*n*) is changed to the turn-off level, and the applied voltage changes from the data voltage Vdata to the parking voltage Vpark, or from the parking voltage Vpark to the data voltage Vdata again, the parking voltage mura Vpark mura may not be visible to a viewer. Accordingly, the uniformity of the display panel 100 may be improved, and thus image quality may be improved.

A display device according to an embodiment of the present disclosure may be described as follows.

One aspect of the present disclosure provides a display device comprising: a display panel including a plurality of pixels connected to a data line and a gate line; a data driver configured to apply a data voltage to the data line for an active period and to apply a parking voltage to the data voltage for a blank period for which the data voltage is not applied thereto; a gate driver for applying a scan signal to the gate line; a light-emission signal generator for applying a light-emission signal to the plurality of pixels; and a controller configured to operate the display device based on a plurality of bands, wherein the plurality of bands have different highest target luminance levels based on operating environments of the device, wherein in at least one of the plurality of bands, a duty ratio of the light-emission signal is smaller than a duty ratio of the parking voltage.

In one implementation of the display device, the duty ratio of the light-emission signal is equal to or less than about 90% of the duty ratio of the parking voltage.

In one implementation of the display device, each of the plurality of pixels includes: a light-emitting element for emitting light in response to drive current; a driving transistor for controlling the drive current, wherein the driving transistor includes a gate electrode acting as a first node, a source electrode acting as a second node, and a drain electrode acting as a third node; a first transistor for diode-connecting the first node and the third node to each other; a second transistor for applying the data voltage or the parking voltage to the second node; a third transistor for applying a high-potential voltage from a fourth node to the second node; a fourth transistor constituting a current path between the driving transistor and the light-emitting element; a fifth transistor for applying a first bias voltage to the third node; a sixth transistor for applying a second bias voltage to a fifth node, wherein an anode electrode of the light-emitting element acts as the fifth node; and a storage capacitor having one electrode connected to the first node, and the other electrode connected to the fourth node.

In one implementation of the display device, an operation period of the display device includes a stress period, an initial period, a sampling period, and an emission period, wherein during the stress period, a stress voltage is applied to the drain electrode of the driving transistor, wherein during the initial period, the first node and the third node is initialized based on an initialization voltage, wherein during the sampling period, the data voltage is applied to the second node, wherein during the emission period, the drive current is applied to the light-emitting element to perform light-emission.

In one implementation of the display device, the scan signal includes: a first scan signal for controlling the first transistor; a second scan signal for controlling the second transistor; and a third scan signal for controlling the fifth transistor.

In one implementation of the display device, a change timing of the light-emission signal to a turned-on level does not overlap with a change timing of a voltage applied to the data line.

In one implementation of the display device, the light-emission signal changes to a turned-on level when at least 3 horizontal periods have elapsed after the third scan signal changes to a turned-off level.

In one implementation of the display device, the controller is configured to vary an operation frequency based on a refresh rate, wherein the third scan signal has a frequency higher than the operation frequency.

In one implementation of the display device, the frequency of the third scan signal is two or more times of the operation frequency.

In one implementation of the display device, the light-emission signal has a frequency four times higher than the operation frequency.

In one implementation of the display device, the duty ratio of the light-emission signal is about 8% in a band having a lowest highest target luminance level among the plurality of bands.

In one implementation of the display device, the plurality of bands includes first to thirteenth bands, wherein each of in the first to thirteenth bands, a dimming level is adjusted based on the duty ratio of the light-emission signal or a magnitude of the data voltage.

The features, structures, effects, etc., as described in the above-described embodiments of the present disclosure are included in at least one example of the present disclosure, and are not necessarily limited to one example. Furthermore, the features, structures, effects, etc., as disclosed in at least one example of the present disclosure may be combined with other or modified in another example by a person having ordinary knowledge in the field to which the present disclosure belongs. Therefore, the contents related to these combinations and modifications should be interpreted as being included in the scope of the present disclosure.

A scope of protection of the present disclosure should be construed by the scope of the claims, and all technical ideas within the scope equivalent thereto should be construed as being included in the scope of the present disclosure. Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a plurality of pixels, each of the plurality of pixels being connected to a respective data line and a respective gate line;

a data driver configured to apply a data voltage to the data line for an active period and to apply a parking voltage to the data line for a blank period for which the data voltage is not applied;

a gate driver for applying a scan signal to the gate line;

a light-emission signal generator for applying a light-emission signal to the plurality of pixels; and a controller configured to operate the display device based on a plurality of bands, wherein the plurality of bands have different highest target luminance levels based on operating environments of the display device, wherein in at least one of the plurality of bands, a duty ratio of the light-emission signal is smaller than a duty ratio of the parking voltage.

2. The display device of claim 1, wherein the duty ratio of the light-emission signal is equal to, or smaller than about, 90% of the duty ratio of the parking voltage.

3. The display device of claim 1, wherein each of the plurality of pixels includes:

a light-emitting element for emitting light in response to a drive current;

a driving transistor for controlling the drive current, wherein the driving transistor includes a gate electrode acting as a first node, a source electrode acting as a second node, and a drain electrode acting as a third node;

a data supply transistor connected between the data line and the second node;

a first light-emission control transistor connected between a high-potential voltage and the second node; and a first bias transistor connected between a first bias voltage and the third node.

4. The display device of claim 3, wherein a refresh frame of the display device includes a stress period, a sampling period, and an emission period, wherein during the stress period, the first bias transistor is turned on to apply the first bias voltage to the third node, wherein during the sampling period, the data supply transistor is turned on to apply the data voltage to the second node, and wherein during the emission period, the first light-emission control transistor is turned on in response to the light-emission signal to apply the high-potential voltage to the second node.

5. The display device of claim 4, wherein the stress period includes a first stress period before the sampling period, and a second stress period between the sampling period and the emission period.

6. The display device of claim 4, wherein the controller is configured to vary an operation frequency of the display device based on a refresh rate of the data voltage, wherein the stress period has a frequency higher than the operation frequency.

7. The display device of claim 6, wherein the frequency of the stress period is two or more times the operation frequency.

8. The display device of claim 3, wherein each of the plurality of pixels further includes:

a second bias transistor connected between a second bias voltage and an anode electrode of the light-emitting element.

9. The display device of claim 3, wherein each of the plurality of pixels further includes:

a second light-emission control transistor connected between the third node and an anode electrode of the light-emitting element.

10. The display device of claim 3, wherein each of the plurality of pixels further includes:

a compensation transistor for diode-connecting the first node and the third node to each other.

11. The display device of claim 3, wherein the light-emission signal changes to a turn-on level when at least 3 horizontal periods have elapsed after the first bias transistor is turned off.

12. The display device of claim 1, wherein a timing of the light-emission signal changing to a turned-on level does not overlap with a timing of a voltage applied to the data line changing between the data voltage and the parking voltage.

13. The display device of claim 1, wherein the light-emission signal has a smallest duty ratio in a band having a smallest highest target luminance level among the plurality of bands.

14. The display device of claim 13, wherein the duty ratio of the light-emission signal having the smallest duty ratio is about 8%.

15. The display device of claim 1, wherein in each of the plurality of bands, a dimming level is adjusted based on at least one of the duty ratio of the light-emission signal or a magnitude of the data voltage.

* * * * *